United States Patent
Edel et al.

(10) Patent No.: US 8,055,943 B2
(45) Date of Patent: Nov. 8, 2011

(54) SYNCHRONOUS AND ASYNCHRONOUS CONTINUOUS DATA PROTECTION

(75) Inventors: Stephen F. Edel, San Jose, CA (US); David M. Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 12/429,374

(22) Filed: Apr. 24, 2009

(65) Prior Publication Data

US 2010/0275055 A1  Oct. 28, 2010

(51) Int. Cl.
    *G06F 11/00* (2006.01)
(52) U.S. Cl. .......................................... 714/20; 707/648
(58) Field of Classification Search .......................... None
    See application file for complete search history.

(56) References Cited

U.S. PATENT DOCUMENTS

| | | | |
|---|---|---|---|
| 5,442,797 A | 8/1995 | Casavant et al. | |
| 5,623,599 A | 4/1997 | Shomler | |
| 5,734,818 A | 3/1998 | Kern et al. | |
| 5,764,903 A | 6/1998 | Yu | |
| 6,848,021 B2 | 1/2005 | Segev et al. | |
| 7,130,974 B2 | 10/2006 | Iwamura et al. | |
| 2004/0030837 A1* | 2/2004 | Geiner et al. | 711/133 |
| 2004/0260736 A1* | 12/2004 | Kern et al. | 707/204 |
| 2005/0015414 A1 | 1/2005 | Blea et al. | |
| 2005/0160248 A1* | 7/2005 | Yamagami | 711/170 |
| 2006/0195666 A1* | 8/2006 | Maruyama et al. | 711/162 |
| 2006/0224639 A1 | 10/2006 | Watanabe et al. | |
| 2006/0271815 A1 | 11/2006 | Mizuno et al. | |
| 2007/0050573 A1* | 3/2007 | Arakawa et al. | 711/162 |
| 2007/0061531 A1* | 3/2007 | Bartfai et al. | 711/162 |
| 2007/0079171 A1 | 4/2007 | Aidun | |
| 2007/0198791 A1 | 8/2007 | Iwamura et al. | |
| 2007/0254922 A1* | 11/2007 | Hiraiwa et al. | 514/338 |
| 2008/0104443 A1* | 5/2008 | Akutsu et al. | 714/6 |
| 2008/0178041 A1 | 7/2008 | Takahashi et al. | |
| 2008/0244035 A1 | 10/2008 | Horie | |

FOREIGN PATENT DOCUMENTS

WO   2007095587 A2   8/2007

\* cited by examiner

*Primary Examiner* — Gabriel Chu
(74) *Attorney, Agent, or Firm* — Griffiths & Seaton PLLC (57) ABSTRACT

A method, system, and computer program product for providing continuous data protection for write data supplied from a host incorporating a processor device to data storage in accordance with write input/output (I/O) of an owning application is provided. The write data is identified as one of a synchronous candidate and an asynchronous candidate. The write data identified as the one of the synchronous candidate and the asynchronous candidate is transferred to at least one sidefile. The write data transferred to the at least one sidefile is secured in a nonvolatile storage journal. The nonvolatile storage journal is preset with a timeout limit applicable to write data identified as the synchronous candidate. If the timeout limit is exceeded, a loss mitigation operation to safeguard the write data identified as the synchronous candidate is performed.

24 Claims, 7 Drawing Sheets

SYNCHRONOUS AND ASYNCHRONOUS CONTINUOUS DATA PROTECTION

DOCUMENTS INCORPORATED BY REFERENCE

Commonly assigned U.S. Pat. No. 5,734,818 is incorporated for its showing of a data storage system configured to provide self describing record sets having prefix headers including time stamps of write I/O operations for data storage, for example, for time based sequence ordering of record updates of the data between primary and secondary data storage sites.

BACKGROUND OF THE INVENTION

1. Field of the Invention

The present invention relates in general to data storage systems, and more particularly to apparatus, method and computer program product embodiments for providing synchronous and asynchronous mechanisms combined with continuous data protection.

2. Description of the Related Art

Data backups are mechanisms well known in the industry that are used to allow users to restore their data due to failure of a component, human error, software corruption, or some other type of disaster. However, when traditional data backup needs to be recovered, the process can result in loss of data, as the recovery point of the data is limited to the point in time represented by the last backup. If recovery is needed to a point in time that is closer to when the disaster occurred, then more frequent backups are required. Continuous mirroring of data is also a common deployment in the preservation of data as it provides the ability to recover from a loss of access to data due to physical device failures, loss of power or networking, and other disasters. Synchronous mirroring, in which 2 or more copies of the data are preserved before informing a host that the writing of the data is complete, can provide a recovery point with no data loss. Although synchronous mirrors are very robust against physical events, they remain vulnerable to logical data errors or viruses, which are propagated automatically and quickly to the mirror target, rendering both copies of the data invalid.

Alternate disaster recovery deployments to protect data include asynchronous replication which has the advantage of allowing significantly longer distances between a primary (production) site and a secondary (disaster recovery) site to prevent loss of data resulting from a metropolitan disaster. However, the main disadvantage of an asynchronous solution is that it cannot guarantee that there is no data loss. Some amount of data in transit is usually lost when there is a failure at the primary site or within the networks connecting the two sites. The amount of data lost depends on distance, available bandwidth between the sites, and specific asynchronous implementation characteristics but can range from seconds to hours of lost data.

In order to capture the benefits of both distance and zero data loss, many users deploy more complex combinations of both a synchronous and asynchronous replication method. This however adds complexity and expense to the overall disaster recovery solution, and still does not protect against software corruption, human error, or viruses because these are replicated to the secondary site.

SUMMARY OF THE INVENTION

Continuous data protection, or CDP, is a type of data resiliency solution that provides recovery to a previous point in time by maintaining a continuous record of all updates to a protected set of data while also providing some mechanism for returning the data to a previous state before an update. CDP solutions primarily protect against logical data errors such as those caused by user errors, incorrect programs, malicious programs and actions, and faulty input data by maintaining a continuous record of updates like a mirror, but a recovery copy can be restored without propagating a logical error. The recovery of a point in time within a CDP continuum provides access to data at points in time which are not available when restoring a backup, which is limited to the point in time the backup was taken. CDP solutions have the ability to reproduce any point in time contained in the update stream. In addition to its ability to recover from logical data errors, CDP can provide the effect of an incremental backup in environments where a small percentage of data changes over a given time period.

While CDP solutions deployed at the local site can protect all data, if a disaster strikes the local site one would have to revert to the disaster site to recover data. CDP deployments could instead be implemented at a remote site to protect against this scenario. Such deployments in the current art would typically be implemented in conjunction with an asynchronous based mirroring technology. A CDP solution based on an asynchronous mirroring technology will only be able to restore points in time up to the last consistency group set of data that was recorded before a failure or corruption occurs at the primary data site. This still leaves seconds, minutes or hours of data that would be unrecoverable in a typical CDP deployment as defined in the current art today. In order to also protect data with "no data loss" a separate, independent synchronous replication scheme would also need to be used. Even in this case with both a synchronous mirroring deployment and an asynchronous CDP deployment, corruption of some of the most recent write data (such as due to software or human error) would be immediately replicated to the remote synchronous site, thereby rendering the mirrored data unusable, while delays inherent in the technology of the current art asynchronous CDP system (or distance of the CDP system from the primary site) may cause potentially good write data to remain uncommitted to non-volatile storage.

In view of the above, a need exists for a mechanism to better provide CDP-type functionality without the drawbacks described above. Accordingly, in one embodiment, by way of example only, a method, system, and computer program product for providing continuous data protection for write data supplied from a host incorporating a processor device to data storage in accordance with write input/output (I/O) of an owning application is provided. The write data is identified as one of a synchronous candidate and an asynchronous candidate. The write data identified as the one of the synchronous candidate and the asynchronous candidate is transferred to at least one sidefile. The write data transferred to the at least one sidefile is secured in a nonvolatile storage journal. The nonvolatile storage journal is preset with a timeout limit applicable to write data identified as the synchronous candidate. If the timeout limit is exceeded, a loss mitigation operation to safeguard the write data identified as the synchronous candidate is performed.

In another embodiment, again by way of example only, a system for providing continuous data protection for write data supplied from a host incorporating a processor device to data storage in accordance with write input/output (I/O) of an owning application is provided. A primary control unit is adapted for identifying the write data as one of a synchronous candidate and an asynchronous candidate, and transferring the write data identified as the one of the synchronous candidate and the asynchronous candidate to at least one sidefile. At least one nonvolatile storage journal is in communication with the primary control unit. The nonvolatile storage journal is adapted for securing the write data transferred to the at least one sidefile. The at least one nonvolatile storage journal is preset with a timeout limit applicable to write data identified as the synchronous candidate. If the timeout limit is exceeded, a loss mitigation operation to safeguard the write data identified as the synchronous candidate is performed.

In still another embodiment, again by way of example only, a computer program product for providing continuous data protection for write data supplied from a host incorporating a processor device to data storage in accordance with write input/output (I/O) of an owning application is provided. The computer program product comprises a computer-readable storage medium having computer-readable program code portions stored therein. The computer-readable program code portions include a first executable portion for identifying the write data as one of a synchronous candidate and an asynchronous candidate, a second executable portion for transferring the write data identified as the one of the synchronous candidate and the asynchronous candidate to at least one sidefile, and a third executable portion for securing the write data transferred to the at least one sidefile in a nonvolatile storage journal, the nonvolatile storage journal preset with a timeout limit applicable to write data identified as the synchronous candidate. If the timeout limit is exceeded, a loss mitigation operation to safeguard the write data identified as the synchronous candidate is performed.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
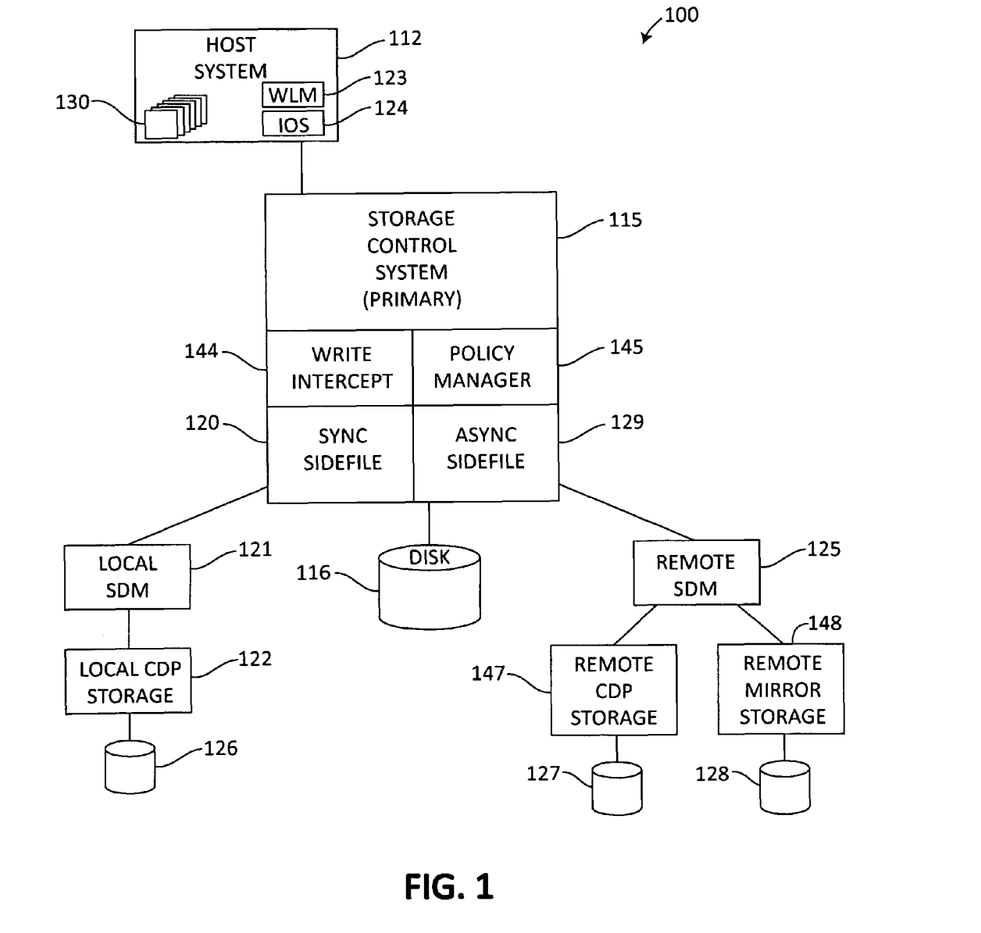
FIG. 1 is a block diagram showing a data storage system and a host system, which may implement at least a portion of the present invention.

Referring to FIG. 1, a data storage system 100 is illustrated in conjunction with a host system 112. Data storage system 100 may be configured to perform continuous data protection (CDP) functionality, as will be described further below. Typically, the host system 112, which may comprise one or more host processors, and may comprise a network, comprises applications 130 that generate data to be stored by the data storage system 110. The data storage system comprises, for example, a storage control system 115 having a number of drive devices 116, such as disk drives, for example, in the form of a RAID (Redundant Array of Independent Disks) or JBOD (Just a Bunch of Disks). The storage control system 115 may also be in communication with long-term storage such as magnetic tape or optical disks 116, for example, in the form of an automated data storage library. An example of a storage control system 115 that may be operated in accordance with the present invention comprises the IBM® DS8000.

The storage system 100 incorporates a workload manager (WLM) 123 configured to direct the processing of supplied data for storage. The workload manager 123 may reside in the storage control system 115 or in a host system 112, or both. In one embodiment, the workload manager 123 comprises a component of an operating system (O/S) of the host system 112 along with an I/O subsystem (IOS) component 124.

The workload manager 123 may comprise program code and any suitable logic, microprocessor, and associated memory and/or data storage for responding to program code, and the associated memory and/or data storage may comprise fixed or rewritable memory or data storage devices. The workload manager 123 may comprise program code within the program code of the storage system 100, or may comprise an application employed by the storage system 100. The program code may be supplied to the storage system directly as from a data storage device or memory, for example by an input from an optical disk or floppy disk, for example at an operator panel (not shown) or drive of the storage system 100, or by being read from a magnetic tape cartridge, for example at a drive device 116, or from a network, for example via host system 112, or by any other suitable means. The workload manager 123 may be physically stored at the host system 112, the storage control system 115 or any point in the data storage system 100, or spread across the data storage system.

The data storage system 100 may comprise primary and secondary sites, for example, with host system 112, storage control system 115 with drive devices 116 comprising the primary site. A local system data mover (SDM) module 121 attached to local continuous data protection (CDP) module 122, which is in turn connected to a storage device 126, such as the devices comprising device 116 as previously described, comprises one secondary site. A remote SDM module 125, attached to remote CDP storage module 147 and storage device 127, and remote mirror storage 148 and storage device 128 comprises an additional secondary site. The data storage system may thus provide data storage at the primary site and shadow the data at the secondary sites, transferring the data synchronously or asynchronously as will be further described.

To perform both asynchronous and synchronous continuous data protection as will be described, following, the storage control system employs a synchronous and asynchronous sidefile 120 and 129, respectively, for temporary holding of data during data movement operations. The operations of such sidefiles will be also further described below. Write intercept module 144 is used in combination with policy manager module 145 to implement and execute various CDP policies. For example, intercept module 144 determines whether a particular write is of an asynchronous or synchronous nature based on an identifier tag as will be further described. Depending on the nature of the write, the policy manager 145 implements a particular CDP policy.

The local and remote SDMs 121 and 125 form consistency groups which are written to a journal (not shown). The consistency groups are all I/Os of a small period of time. It is important that cross volume and cross storage control system data consistency is maintained. In one embodiment of the present invention, the data storage system 100 is configured to write data supplied from a host 112 to data storage in accordance with write I/O of an owning application 130. Examples of applications may comprise accounting, payroll, information management and data base applications, etc. The data storage may comprise a single device, a single site with multiple storage devices, a single site with multiple storage systems, primary and secondary sites as illustrated in FIG. 1, or primary and multiple secondary sites.

Figure 2:
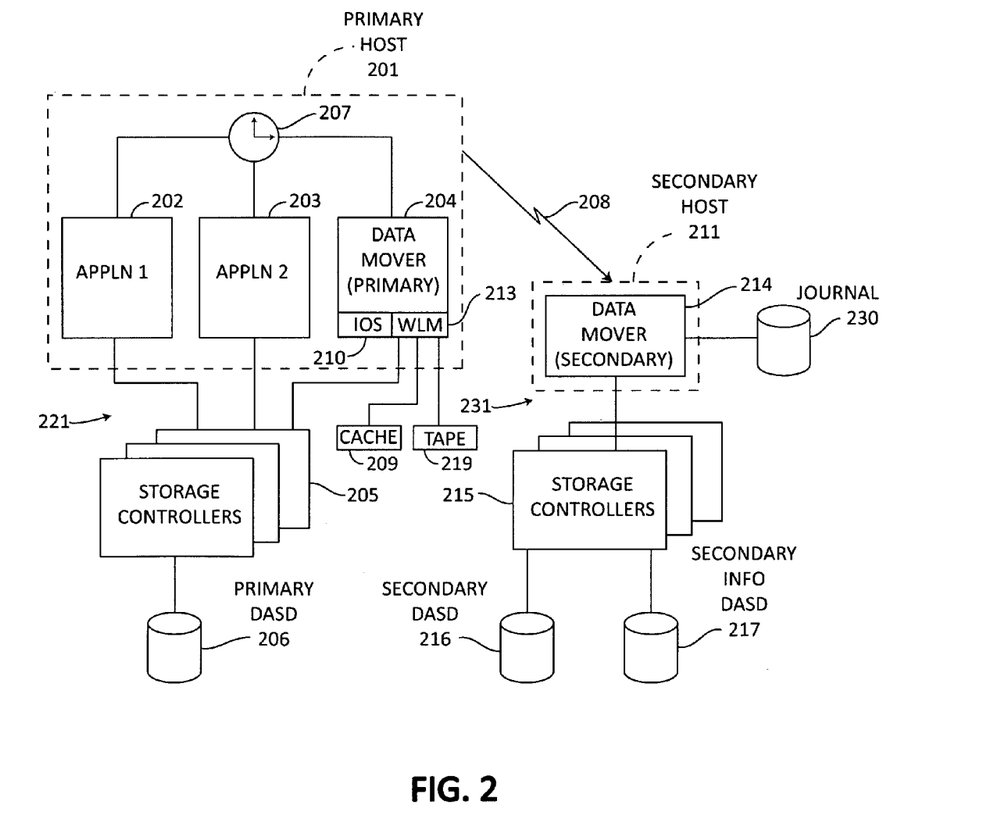
FIG. 2 is a block diagram showing an alternative embodiment of a data storage system and host systems for implementing the present invention.

Referring to FIG. 2, an alternative embodiment of a data storage system 200 is illustrated in which a primary host 201 provides the communications with respect to the secondary site through a secondary host 211. Two applications 202, 203 are illustrated and represent a potentially large number of applications. Data storage is run via a data mover 204 at the primary site 221, with a sysplex clock 207 of the primary host, and via a data mover 214 at a secondary site 231. This is an arrangement discussed by the incorporated '818 patent, wherein the host comprises at least one primary processor and at least one secondary processor. An example of a processor is the IBM® System z10 having System Data Mover software. Also at each site are storage controllers 205 and 215 containing direct access storage devices such as hard disk drives. Examples of storage controllers comprise IBM® DS/8000 storage controllers.

In accordance with the present invention, the workload manager 213 may be resident at the data mover 204. The workload manager 213 may be configured to provide identification information of storage data for use by an I/O subsystem 210 to be provided to the storage subsystem storage controllers 205 via a Channel Command Word (CCW) or equivalent, such as a define extent CCW or a prefix CCW. The storage subsystem controllers 205 may be adapted to build Read Record Set prefix headers for specific storage volumes. The record set information is collected by the storage control system at data mover 204 and the data mover forms the consistency groups. The record set information incorporates the identification information from the Read Record Set prefix header. As will be further described, I/O data, such as write data, may be read from the primary host 201 by the data mover 204 into a "sidefile." In one embodiment, the sidefile is initially stored in cache 209. The sidefile comprises a basis for forming the consistency groups by the storage system at site 231 and the secondary data mover 214 is operated to store the data of the consistency groups at secondary DASD 216. Movement of write data from the sidefile of the primary site/control unit to the secondary site via the data mover 214 is employed for continuous data protection (CDP) operations during data shadowing operations as will be further described.

The present invention incorporates mechanisms whereby the CDP functionality performed by data storage systems 100 and 200 are improved. These mechanisms extend the current state of the art of asynchronous based CDP functionality by providing a methodology for eliminating data loss by securing every write as it occurs onto a CDP storage system with non-volatile storage before posting a write complete message to the host/application. Selected storage volumes, data sets, or even individual writes within a volume are designated to/assigned as either a synchronous CDP candidate or an asynchronous CDP candidate. The designation may occur either manually or through the administration of one or more policies.

Each data write provided from the host application to the storage subsystem may be labeled/tagged as synchronous or asynchronous. In one embodiment, this designation may be provided through the use of prefix functionality previously described. A pre-set or variable response time threshold may be implemented in association with the non-volatile storage, as will be further described. This provides for a set of criteria, such as time of day, workload dependency, and write data dependency, which if exceeded causes the system to transform from operating in a synchronous mode to an asynchronous mode. If a previously operating synchronous system reverts to an asynchronous mode, this change may be indicated through the use of time stamping or similar functionality. Optionally, in the case of an extended response time threshold, or in the case of a CDP system or primary control unit failure, the ability to pre-set an "extended timeout limit" that allows the application to continue even if it the write data has not been committed to non-volatile storage may be provided.

The present invention provides a means to communicate between the primary storage control system and the CDP site for purposes of notifying the CDP site that data is available to be written or for identifying that data is available to be read. Automated software may be implemented that may continue to attempt to restore CDP systems back to synchronous mode when write workloads are sufficiently reduced (or temporary communication or hardware/software failures have been restored) to allow the CDP system to apply all remaining journaled writes that have not been committed to nonvolatile storage. Alternatively, the software may provide the option of automatically halting the owning application if synchronous mode is lost, rather than transfer into an asynchronous mode with potential data loss. Still alternately, upon a loss of synchronous mode, a user may manually terminate the application.

The mechanisms of the present invention provide several advantages. For example, the mechanisms reduce complexity and management by deploying a single scheme that simultaneously provides for disaster recovery and continuous data protection with no data loss. The mechanisms provide user flexibility and faster recovery times by allowing volumes to be selectively placed in either a synchronous or asynchronous continuous data protection mode through tagging/marking, which in turn can be set either manually or by policies. Finally, the mechanisms promote reduction in configuration complexity and management by deploying a single scheme which can provide continuous data protection and synchronous replication with an option to convert to asynchronous replication (and back again) to avoid response time delays, all based on policies and/or workload thresholds.

In some embodiments, as will be further described, a synchronous CDP site may work in concert with an asynchronous CDP site to provide additional benefits and advantages. In this way, a complete solution providing synchronous and asynchronous replication combined with CDP functionality allows for complete protection of data due to both disasters and human or software errors. These embodiments deploy two CDP environments, one being a synchronous CDP deployment which provides for no data loss by securing every write as it occurs onto a CDP storage system before posting a write complete to the host/application, and a second asynchronous CDP deployment usually located at a sufficient distance from the synchronous CDP deployment to provide the user with disaster recovery capability.

These embodiments, along with the embodiments previously described, provide a method to tag/label each write data as either a synchronous CDP candidate or asynchronous CDP candidate communicated through the use of prefix information (or by other means) that associate the write data to the application for the purposes of identifying which storage device to commit the data to. The embodiments allow a storage control unit containing the write data (sidefile) to be read simultaneously from either the synchronous or asynchronous CDP system such that whichever CDP system reads the write data and commits it to cache/storage first will fulfill the requirement for no data loss that can be communicated back to the application. An input/output (I/O) priority scheme may be provided such that write data marked as synchronous CDP will be committed to non-volatile storage ahead of previously queued up asynchronous CDP write data. Two (or more) logically or physically separate sidefiles (or groups of sidefiles) may be employed which are uniquely associated with providing data to either the synchronous write CDP data or to the asynchronous write CDP data.

In these embodiments, in the case of a synchronous CDP failure, network failure, or any other event that creates an excessive response time delay, the ability as described previously to pre-set a timeout limit is provided that allows the application or primary controller to commit the write data targeted to the synchronous CDP data to a separate sidefile which will be alternately read and journaled in the asynchronous CDP system. In the event of a synchronous CDP failure, automated software may be adapted to reapply the previously stored journaled data temporarily in the asynchronous CDP system back to the originally targeted synchronous CDP system. In the event of an asynchronous CDP failure, the automated software may be adapted to reapply the journaled data temporarily being stored on the synchronous CDP system back to the asynchronous CDP system. In the event of a disaster or failure where any CDP system resides, the available variety of CDP journals implemented on solid state disks, nonvolatile read-only memory (NVRAM), or other robust storage devices provides for the physical journals to be transmitted or transported and applied to an alternate CDP system in order to recover data, provide currency and/or provide consistency among CDP systems.

In the case of a disaster or failure of a CDP system, upon recovery of that system, automated software may be adapted to reconcile the state of that previously failed system with one or more of the other CDP system journals with the state of the asynchronous CDP journals such that the differences between the two can be applied to either system to bring it up to concurrency with the synchronous CDP system before the failure. In the case where the asynchronous CDP system stores data that is different than that stored on the synchronous CDP system and the asynchronous CDP system has a failure, network failure, or any other disaster event that prevents it from storing data, a primary control unit may be adapted to allow the unrecorded asynchronous data to be read and journaled in the synchronous CDP system until the asynchronous CDP system has recovered.

Embodiments featuring synchronous and asynchronous recovery sites also present several advantages that are similar to those described above. These advantages again promote a reduction in configuration complexity and management by deploying a single CDP technology that can be used to provide both synchronous and asynchronous replication as well as continuous data protection for multiple locations. The ability to commit write data to ensure continuous data protection in the synchronous CDP journal eliminates application response time delays found in synchronous implementations that can result when the secondary device goes "busy" (e.g. array build, write inhibit, etc.) waiting for the data to be committed. The ability to tag only a subset of all data as synchronous CDP can reduce the bandwidth necessary to transmit the data to the synchronous CDP system. The ability to tag only a subset of all data as synchronous CDP can reduce the response time involved in storing the synchronous CDP data and responding back to the application. The ability to tag the (critical) subset of data as synchronous CDP can reduce the recovery time (improved RTO) after a disaster or failure to resume operations.

In addition to the foregoing, a fast, remote no data loss disaster recovery solution is provided by applying only the incremental write differences to the asynchronous CDP system that were already applied to the synchronous CDP system before it failed, without having to do full volume copy. The ability to resolve two different CDP systems by automatically comparing the differences in the write data stored on each system is provided. Upon failure of one CDP system with different write data sets, the ability for the alternate CDP system to record the data temporarily on behalf of the failed system until it recovers is provided. Ability to manage heterogeneous storage vendors in both a synchronous CDP and asynchronous CDP mode concurrently is also provided.

The mechanisms of the present invention provide an option for some or all applicable storage volumes to be part of a synchronous replication based CDP deployment and for some or all volumes to be part of an asynchronous CDP deployment. This option may be selected either manually by the user or by optional policies that define which type of continuous data protection plus (no or potential) data loss replication to apply to the data. The owning application performs a write to a primary storage device and the CDP primary sidefile. The sidefile within the primary storage device then prompts/notifies the System Data Mover (SDM) within the synchronous CDP system that data is ready to be read, which occurs after each updated write that is stored in that sidefile. The SDM then does an immediate read of the written data from the sidefile and writes the data immediately to a nonvolatile journal. The SDM then issues an immediate "Read Next" (or write complete) back to the sidefile in the primary control unit, which then sends a "device end" back to the application, thereby securing the last written I/O into a CDP system. Every updated write may be captured while other I/O (such as reads) are allowed to proceed. Selected data may be allowed to operate in both a synchronous CDP mode for those data sets that must have no data loss, while other data that was less sensitive to data loss could correspondingly operate in an asynchronous CDP mode.

The applicable storage management system for the CDP environment may be modified to allow for defining which volumes are synchronous CDP candidates and asynchronous CDP candidates. This designation may occur either manually or through policies based on response time criteria, importance of the data, and/or any other criteria that allows for zero data loss guarantees. To address minimizing performance degradation due to delays waiting for CDP data to be written to the journal, the CDP SDM operating on synchronous data may be co-located (but is not required to be) with the primary storage system, within a campus, or within any acceptable (based on response time) distance from the primary storage to balance performance requirements with distance protection requirements for disasters. For non-volatile protection of writes and to further reduce the write performance delays, fast hardened storage devices such as solid state disks or NVRAM can be deployed for journaling of the data or for additional staging of the data prior to journaling. These mechanisms may be extensible to multiple SDMs and multiple sidefiles operating in parallel, either independently or constructed in a Master/Slave configuration for the purposes of ensuring consistent data and timestamp integrity. In an alternative embodiment, the SDM may time stamp write I/O data at a clocking rate that is faster than writes could be deposited at the sidefile used for CDP. Continuous SDM reads may then apply the timestamps to each newly written data in the sidefile. SDM reads with timestamps that have no associated write data in the sidefile may then be discarded.

Turning now to FIGS. 3 and 4A-4C, various exemplary flow chart methods are depicted for implementing synchronous and asynchronous functionality in a continuous data protection system to eliminate data loss. As one skilled in the art will appreciate, various steps in the methods may be implemented in differing ways to suit a particular application. In addition, the described methods may be implemented by various means, such as hardware, firmware, software provided by hardware, firmware, etc., or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Figure 3:
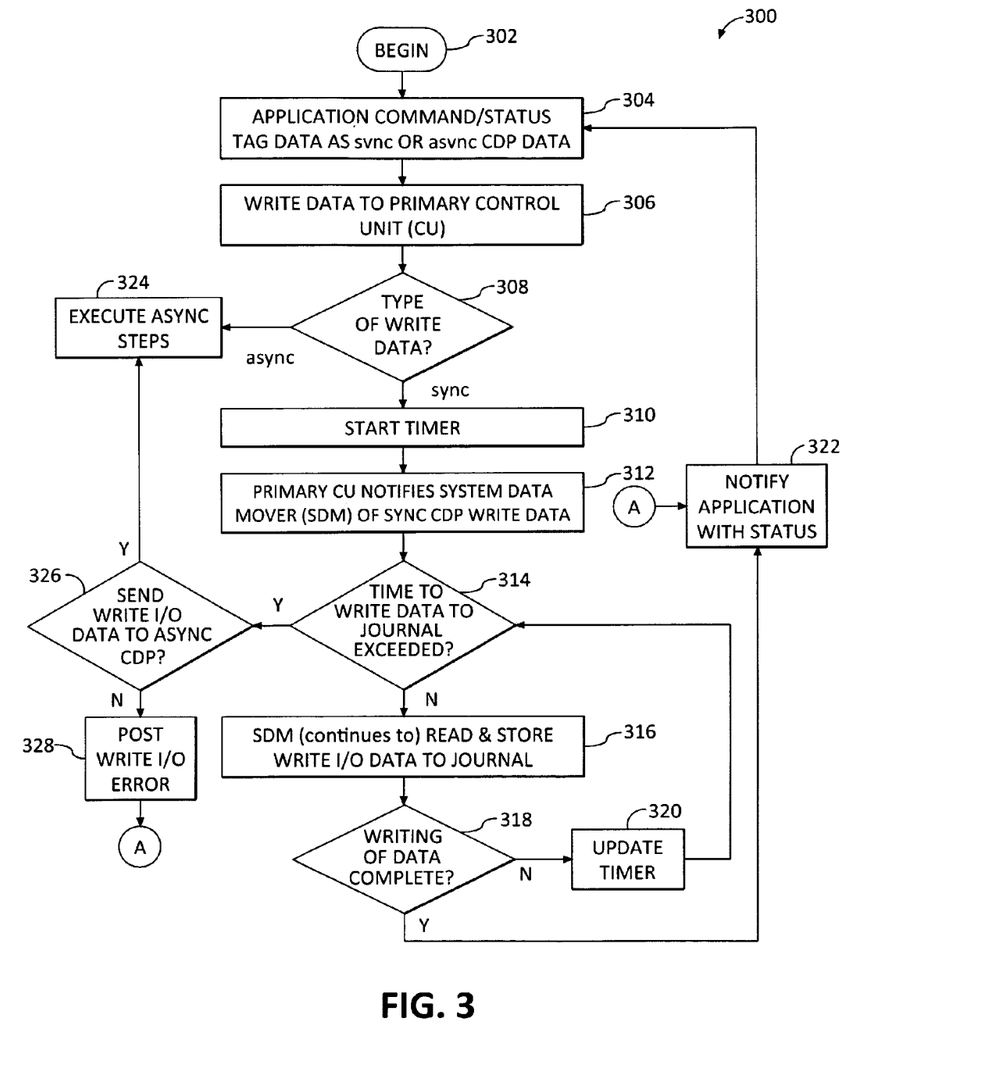
FIG. 3 is a flow chart diagram of an exemplary method for implementing a continuous data protection (CDP) system incorporating both asynchronous and synchronous functionality according to the present invention.

Turning first to FIG. 3, an exemplary flow chart method 300 of a mechanism for tagging/identifying data as being synchronous candidates or asynchronous candidates, as well as a mechanism for implementing a predefined timeout scheme is depicted. Method 300 begins (step 302) with the owning application command/status tagging write I/O data as one of a synchronous or asynchronous CDP data (step 304). Here again, the use of prefix information as previously described may be implemented to perform this functionality. The I/O data is written to a primary control unit (CU) (step 306). If the data is synchronous (step 308), a timer is started (step 310). The primary control unit notifies the system data mover (SDM) of the synchronous CDP site of available write data (step 312).

If a predetermined time to write data to the nonvolatile journal is not exceeded (step 314), then the SDM reads the write I/O from the primary CU and stores (or continues to store as the case may be) the data in the nonvolatile journal (step 316). If the data writing not complete (step 318), the timer is updated accordingly (step 320). If the data writing is complete (again, step 318), then the method proceeds to step 322, where the application is notified with a status message. The method then returns to step 304.

Returning to step 308, if the type of write data is asynchronous, then the data is handled asynchronously depending on the system implemented (step 324). For example, in an implementation with a synchronous deployment and an asynchronous deployment as previously described, the asynchronously labeled data is sent to an asynchronous CDP site. Returning to step 314, if the predetermined time to store the data in the nonvolatile journal is exceeded, the method then queries (for example, pursuant to policy) whether the data should be sent to an asynchronous CDP site (step 326). If so, the data is handled asynchronously (again, step 324). If not, a write I/O error is posted (step 328) and the application is notified (again, step 322).

Figure 4A:
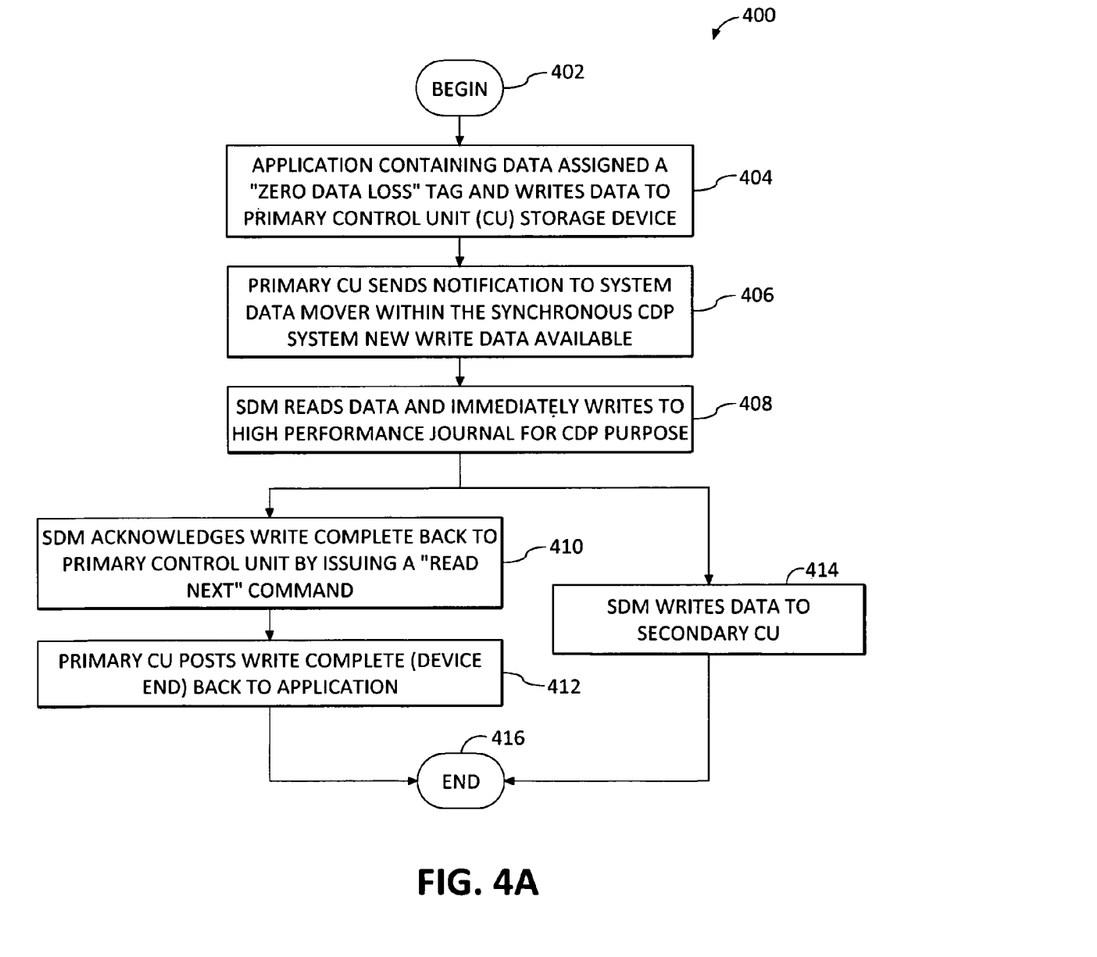
FIG. 4A is a flow chart diagram of synchronous CDP functionality as improved by one or more aspects of the present invention.

Turning now to FIG. 4A, an exemplary method 400 for securing synchronous CDP data based on control unit notification is illustrated. Method 400 begins (step 402) with the application containing the write I/O data assigning a "zero data loss" tag, and writing the data to the primary control unit storage device (step 404). The primary control unit then sends notification to the SDM within the synchronous CDP system informing the system of new write data available (step 406). The SDM reads the data and immediately writes to a high-performance nonvolatile storage journal implemented for CDP purposes (step 408). In parallel, the SDM acknowledges the movement of the data to the primary control unit by issuing a read next command (step 410), while writing the data to the secondary control unit (step 414). The primary control unit then posts the write complete (device end) back to the owning application (412) and the method 400 ends (step 416).

Figure 4B:
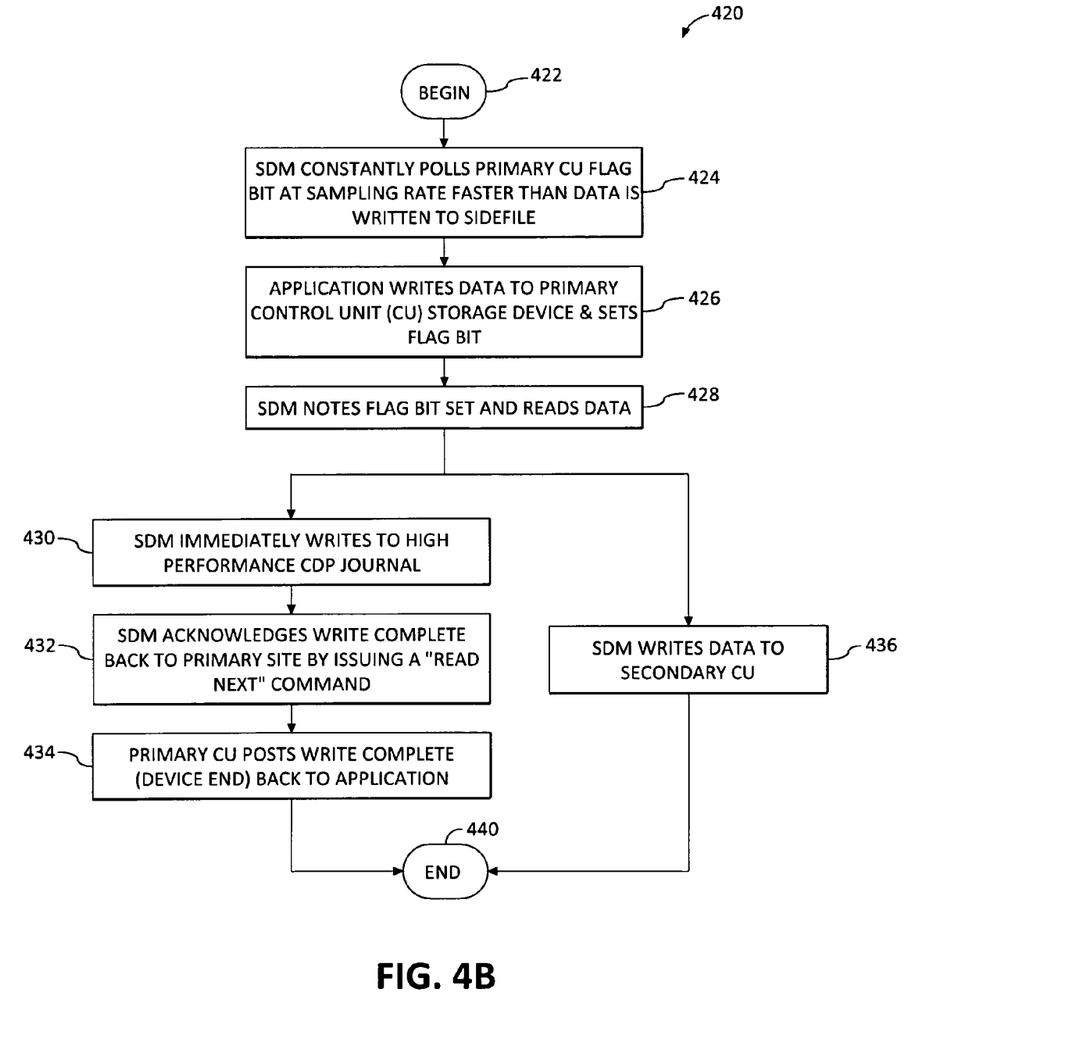
FIG. 4B is a flow chart diagram of additional exemplary synchronous CDP functionality incorporating a polling mechanism.

Turning now to FIG. 4B, an additional exemplary method 420 for securing synchronous CDP data based on a polling mechanism from the system data mover is depicted. Method 420 begins (step 422) with the SDM constantly polling the primary control unit flag bit at a sampling rate faster than the write I/O data is written to the applicable sidefile (step 424). The owning application writes the data to the primary control unit storage device and sets the flag bit (step 426). The SDM notes the flag bit and reads the data from the control unit (step 428).

As a next step, in parallel with the step of writing the data by the SDM to the secondary control unit (step 436), the SDM immediately writes to the high-performance CDP nonvolatile storage journal (step 430), and acknowledges the write complete by issuing the read next command (step 432). The primary control unit then posts the write complete (device end) to the owning application (step 434) and the method 420 then ends (step 440).

Figure 5:
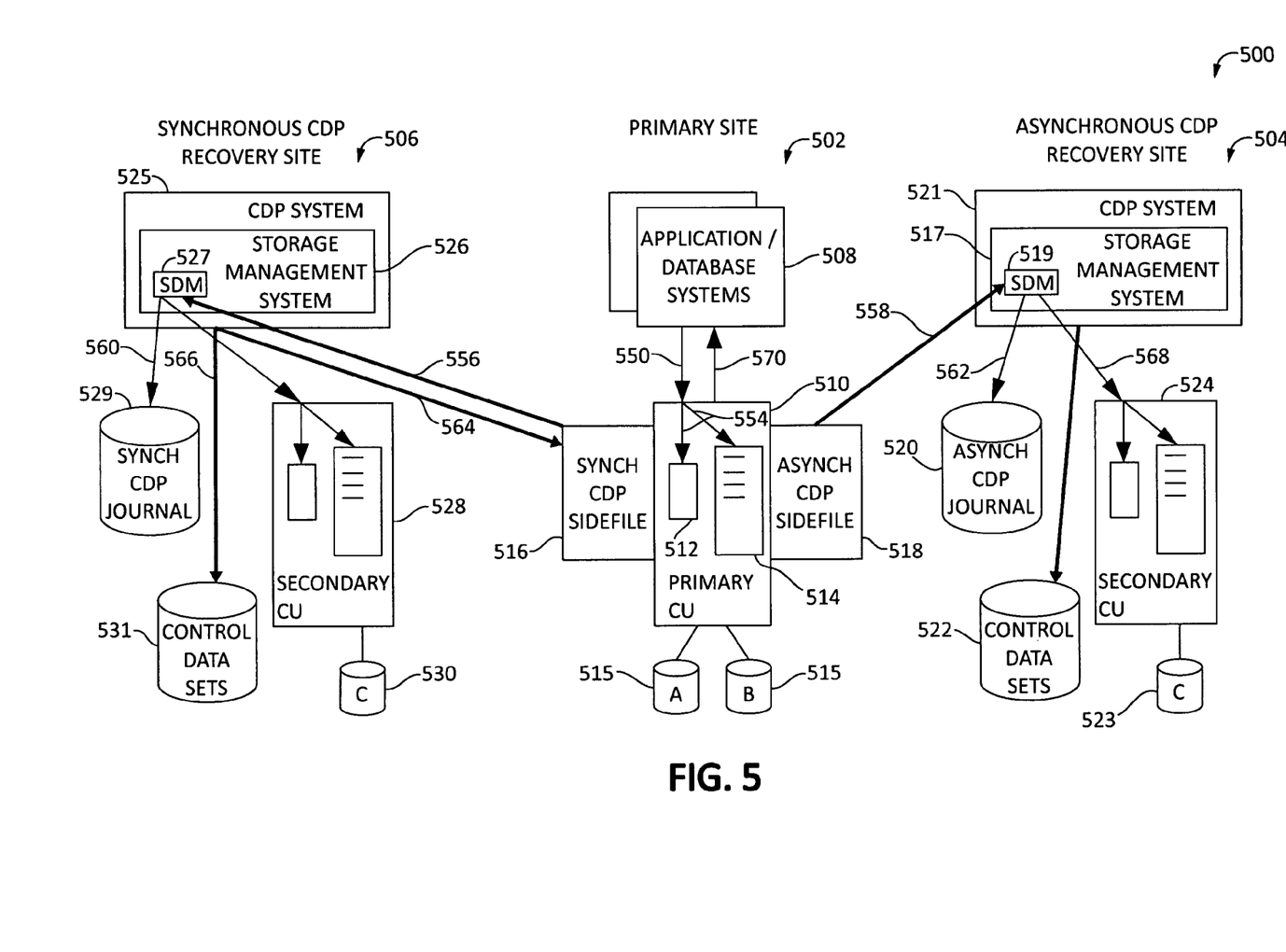
FIG. 5 is a block diagram of an additional alternative embodiment of a data storage system and host systems for implementing the present invention.

Turning briefly to FIG. 5, an exemplary block diagram of a computing environment 500 having a primary site 502 and a separate deployment of an synchronous CDP recovery site (step 506) and an asynchronous CDP recovery site (step 504) as previously described is depicted. On the primary site is the owning application 508 (containing related databases and systems). The owning application is in communication with the primary control unit 510. The asynchronous CDP recovery site 504 includes a CDP system 521 having a storage management system 517. Asynchronous SDM 519 is operable on storage management system 517. The asynchronous SDM 519 is in communication with an asynchronous CDP nonvolatile storage journal 520, control data sets 522, and the asynchronous secondary control unit 524. A secondary storage device (volume C) 523 is connected to the secondary control unit 524. The synchronous CDP recovery site 506 also includes a CDP system 525 having a storage management system 526. Synchronous SDM 527 is operable on the storage management system 526. The synchronous SDM 527 is in communication with a synchronous CDP nonvolatile storage journal 529, control data sets 531, and the synchronous secondary control unit 528. A secondary storage device (volume C) 530 is connected to the secondary control unit 528.

Figure 4C:
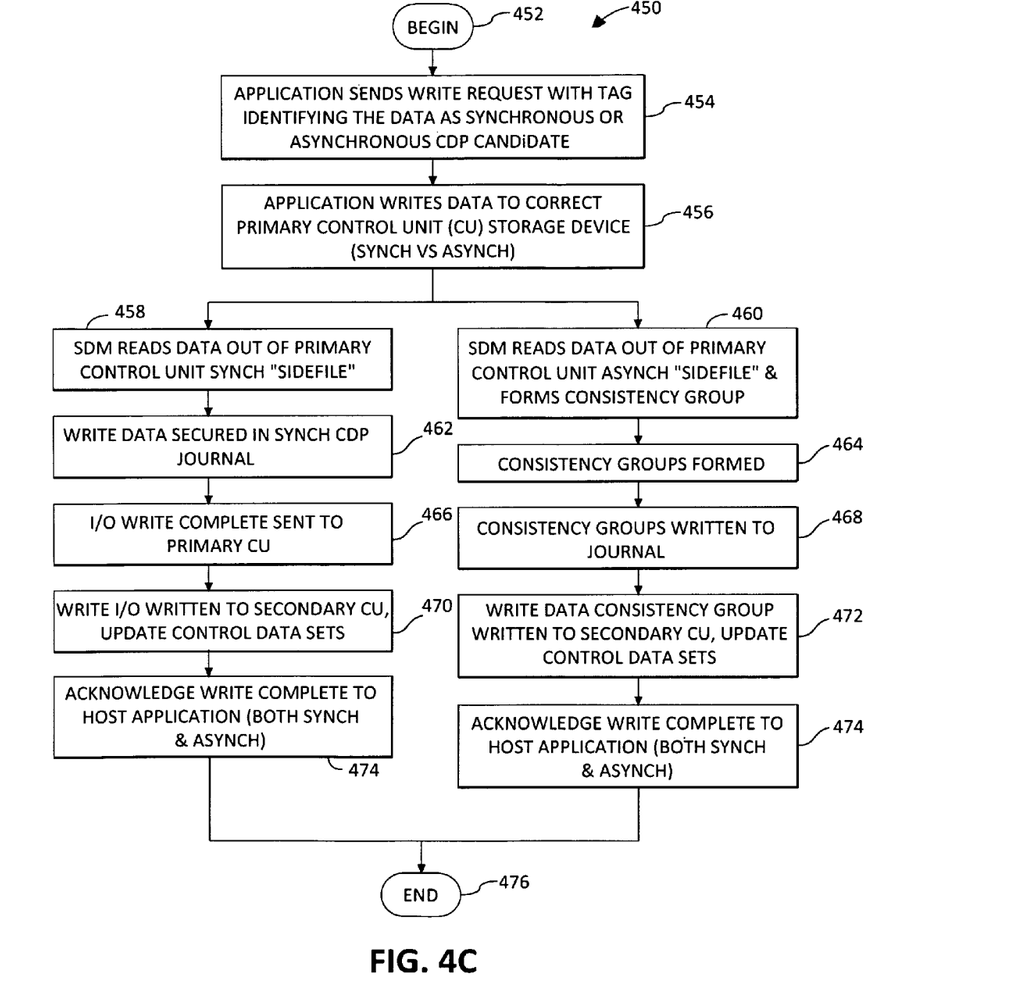
FIG. 4C is a flow chart diagram of exemplary synchronous and asynchronous CDP functionality according to one or more aspects of the present invention.

Turning to FIG. 4C, an exemplary method 450 for securing asynchronous and asynchronous data in an implementation such as the environment 500 depicted in FIG. 5 is depicted. Method 450 begins (step 452), with the owning application sending a write request with a tag identifying the data as either a synchronous or asynchronous candidate (step 454) (represented by arrow 550, FIG. 5). The owing application then writes the data to the correct primary control unit storage device (synchronous or asynchronous) (step 456) (represented by boxes 554, 512, 514, FIG. 5). As a next step, the synchronous SDM reads data out of the primary control unit synchronous sidefile (step 458) (represented by arrow 556, FIG. 5). In parallel with step 458, the asynchronous SDM reads data out of the primary control unit asynchronous sidefile (step 460) and forms a consistency group (represented by arrow 558, FIG. 5).

As a next step, the write data transferred to the synchronous CDP site is immediately secured in the synchronous CDP nonvolatile storage journal (step 462) (represented by arrow 560), and the consistency groups in the asynchronous CDP site are formed (step 464). An I/O write complete is sent to the primary control unit (step 466) (represented by arrow 564, FIG. 5), and the consistency groups on the asynchronous site are written to the asynchronous nonvolatile storage journal (step 468) (represented by arrow 562, FIG. 5). The synchronous write I/O data is written to the synchronous secondary control unit and the control data sets on the synchronous CDP site are updated (step 470) (represented by arrow 566, FIG. 5), while the asynchronous consistency group data is written to the secondary control unit on the asynchronous site (represented by arrow 568, FIG. 5), and the asynchronous control data sets are updated (step 472). The acknowledge write complete message is sent to the host application (for either synchronous and asynchronous data) (step 474) (represented by arrow 570, FIG. 5). The method 450 then ends (step 476).

The foregoing description of the steps in method 450 refer to processing of a single write I/O by the synchronous CDP 506 and asynchronous CDP 504. Processing of the next write I/O starting at step 452 can begin when the I/O complete notification is sent to the primary control unit in step 466, as the next write may proceed as soon as the synchronous CDP has secured the data in the Sync CDP journal (step 462). In this way, the synchronous portion of processing for the next I/O can overlap the asynchronous processing of the previous I/O.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for storage and execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for providing continuous data protection for write data supplied from a host incorporating a processor device to data storage in accordance with write input/output (I/O) of an owning application, comprising:
   identifying the write data as one of a synchronous candidate and an asynchronous candidate as designated by the owning application;
   transferring the write data identified as the one of the synchronous candidate and the asynchronous candidate to at least one sidefile; and
   securing the write data transferred to the at least one sidefile in a nonvolatile storage journal, the nonvolatile storage journal preset with a timeout limit applicable to the write data identified as the synchronous candidate, wherein if the timeout limit is exceeded, performing a loss mitigation operation to safeguard the write data identified as the synchronous candidate.

2. The method of claim 1, wherein designating the write data as one of the synchronous candidate and the asynchronous candidate includes adding candidate information into a prefix, and securing the write data transferred to the at least one sidefile in the nonvolatile storage journal includes providing the candidate information to the nonvolatile storage journal.

3. The method of claim 1, wherein performing the loss mitigation operation includes performing an asynchronous data recovery operation on the write data identified as the synchronous candidate.

4. The method of claim 3, wherein performing the asynchronous data recovery operation includes providing the write data identified as the synchronous candidate to an asynchronous data recovery site.

5. The method of claim 1, wherein performing the loss mitigation operation includes performing at least one of posting an error to a primary control unit, designating the write data identified as the synchronous candidate with a time stamp, providing a notification to the owning application, terminating the application, and providing for a manual termination of the application.

6. The method of claim 1, wherein transferring the write data identified as the one of the synchronous candidate and the asynchronous candidate to at least one sidefile includes transferring the write data identified as the synchronous candidate to a synchronous sidefile, and transferring the write data identified as the asynchronous candidate to an asynchronous sidefile.

7. The method of claim 1, wherein securing the write data transferred to the at least one sidefile in the nonvolatile storage journal includes securing the write data identified as the synchronous candidate to a synchronous nonvolatile storage journal, and securing the write data identified as the asynchronous candidate to an asynchronous nonvolatile storage journal.

8. The method of claim 1, further including, based on a policy, defining at least one storage volume as one of a synchronous and asynchronous volume for storage of one of the write data identified as the synchronous candidate and the write data identified as the asynchronous candidate.

9. The method of claim 1, further including designating the write data secured to the nonvolatile storage journal with a time stamp at a clocking rate faster than a rate the write data is transferred to the at least one sidefile.

10. A system for providing continuous data protection for write data supplied from a host incorporating a processor device to data storage in accordance with write input/output (I/O) of an owning application, comprising:

a primary control unit adapted for identifying the write data as one of a synchronous candidate and an asynchronous candidate, and transferring the write data identified as the one of the synchronous candidate and the asynchronous candidate to at least one sidefile, wherein the owning application provides the write data to the primary control unit designated as the one of the synchronous candidate and the asynchronous candidate; and at least one nonvolatile storage journal in communication with the primary control unit, the nonvolatile storage journal adapted for securing the write data transferred to the at least one sidefile, wherein the at least one nonvolatile storage journal is preset with a timeout limit applicable to the write data identified as the synchronous candidate, and further wherein if the timeout limit is exceeded, a loss mitigation operation to safeguard the write data identified as the synchronous candidate is performed.

11. The system of claim 10, further including at least one system data mover (SDM) in communication with the at least one sidefile, wherein the at least one system data mover is further adapted for, pursuant to a performance of the loss mitigation operation, facilitating performance of an asynchronous data recovery operation on the write data identified as the synchronous candidate.

12. The system of claim 11, wherein the at least one system data mover is further adapted for, pursuant to facilitating performance of the asynchronous data recovery operation, reading the write data identified as the synchronous candidate from the at least one sidefile to an asynchronous data recovery site.

13. The system of claim 11, wherein the at least one system data mover is further adapted for, pursuant to a performance of the loss mitigation operation, performing at least one of posting an error, designating the write data identified as the synchronous candidate with a time stamp, and facilitating providing a notification to the owning application by the primary control unit.

14. The system of claim 11, wherein the at least one system data mover includes a first system data mover operable on a synchronous recovery site and a second system data mover operable on an asynchronous recovery site, and the at least one nonvolatile storage journal includes a first nonvolatile storage journal operable on the synchronous recovery site, and a second nonvolatile storage journal operable on the asynchronous recovery site, wherein the first and second system data movers are adapted for simultaneously reading the write data from the at least one sidefile to the first and second nonvolatile storage journals.

15. The system of claim 10, wherein the primary control unit is further adapted for, pursuant to transferring the write data identified as the one of the synchronous candidate and the asynchronous candidate to at least one sidefile, transferring the write data identified as the synchronous candidate to a synchronous sidefile, and transferring the write data identified as the asynchronous candidate to an asynchronous sidefile.

16. The system of claim 10, wherein the at least one nonvolatile storage journal includes a synchronous nonvolatile storage journal adapted for securing the write data identified as the synchronous candidate, and an asynchronous nonvolatile storage journal adapted for securing the write data identified as the asynchronous candidate.

17. The system of claim 10, wherein the write data includes at least one of a selected volume, a selected data set, and a selected individual data write.

18. A computer program product for providing continuous data protection for write data supplied from a host incorporating a processor device to data storage in accordance with write input/output (I/O) of an owning application, the computer program product comprising a non-transitory computer-readable storage medium having computer-readable program code portions stored therein, the computer-readable program code portions comprising:

a first executable portion for identifying the write data as one of a synchronous candidate and an asynchronous candidate as designated by the owning application;

a second executable portion for transferring the write data identified as the one of the synchronous candidate and the asynchronous candidate to at least one sidefile; and a third executable portion for securing the write data transferred to the at least one sidefile in a nonvolatile storage journal, the nonvolatile storage journal preset with a timeout limit applicable to the write data identified as the synchronous candidate, wherein if the timeout limit is exceeded, performing a loss mitigation operation to safeguard the write data identified as the synchronous candidate.

19. The computer program product of claim 18, wherein the fourth executable portion for designating the write data as one of the synchronous candidate and the asynchronous candidate includes a fifth executable portion for adding candidate information into a prefix, and securing the write data transferred to the at least one sidefile in the nonvolatile storage journal includes providing the candidate information to the nonvolatile storage journal.

20. The computer program product of claim 18, further including a fourth executable portion for, pursuant to performing the loss mitigation operation, performing an asynchronous data recovery operation on the write data identified as the synchronous candidate.

21. The computer program product of claim 20, wherein the fourth executable portion for performing the asynchronous data recovery operation provides the write data identified as the synchronous candidate to an asynchronous data recovery site.

22. The computer program product of claim 18, further including a fourth executable portion for, pursuant to performing the loss mitigation operation, performing at least one of posting an error to a primary control unit, designating the write data identified as the synchronous candidate with a time stamp, providing a notification to the owning application, terminating the application, and providing for a manual termination of the application.

23. The computer program product of claim 18, wherein the second executable portion for transferring the write data identified as the one of the synchronous candidate and the asynchronous candidate to at least one sidefile includes a fourth executable portion for transferring the write data identified as the synchronous candidate to a synchronous sidefile, and transferring the write data identified as the asynchronous candidate to an asynchronous sidefile.

24. The computer program product of claim 18, wherein the third executable portion for securing the write data transferred to the at least one sidefile in the nonvolatile storage journal includes a fourth executable portion for securing the write data identified as the synchronous candidate to a synchronous nonvolatile storage journal, and securing the write data identified as the asynchronous candidate to an asynchronous nonvolatile storage journal.

* * * * *